United States Patent [19]

Yashiro

[11] Patent Number: 5,532,033
[45] Date of Patent: Jul. 2, 1996

[54] OPTICAL INFORMATION RECORDING MEDIUM

[75] Inventor: Toru Yashiro, Kamakura, Japan

[73] Assignees: Ricoh Company, Ltd., Tokyo; Yamada Chemical Co., Ltd., Kyoto, both of Japan

[21] Appl. No.: 424,088

[22] Filed: Apr. 19, 1995

[30] Foreign Application Priority Data

Apr. 20, 1994 [JP] Japan ..................... 6-104501

[51] Int. Cl.$^6$ ................... B32B 3/00
[52] U.S. Cl. ............ 428/64.1; 428/64.2; 428/64.4; 428/64.8; 428/913; 430/270.16; 430/495.1; 430/945; 430/270.16; 369/288; 369/283
[58] Field of Search ............ 428/64.1, 64.2, 428/64.4, 64.8, 913; 430/270, 495, 945; 369/283, 288

[56] References Cited

U.S. PATENT DOCUMENTS

| | | | |
|---|---|---|---|
| 5,132,153 | 7/1992 | Hirose | 428/64 |
| 5,232,757 | 8/1993 | Kalyanaraman | 428/64 |
| 5,248,538 | 9/1993 | Kovacs | 428/64 |

*Primary Examiner*—Patrick J. Ryan
*Assistant Examiner*—Elizabeth Evans
*Attorney, Agent, or Firm*—Oblon, Spivak, McClelland, Maier & Neustadt

[57] ABSTRACT

An optical information recording medium is disclosed which includes a substrate, and an information recording layer provided on the substrate and containing a specific metallophthalocyanine having a substituent which prevents the molecular association of the metallophthalocyanine and which contains at least one of O, S and N atoms.

4 Claims, 2 Drawing Sheets

OPTICAL INFORMATION RECORDING MEDIUM

BACKGROUND OF THE INVENTION

This invention relates generally to an optical information recording medium and, more specifically, to a WORM-type recording medium which can write, only once, with a laser beam and which can repeatedly read the written information with a laser beam.

One known WORM-type compact disc includes a substrate, a light absorption layer obtained by spin coating an organic dye, such as a cyanine dye, on one surface of the substrate, and a metal reflective layer provided on the light absorption layer (Japanese Published Unexamined Patent Applications Nos. 2-42652 and 2-132656). The feasibility of the spin coating permits mass-production of the compact discs and this technique is economically quite advantageous. The known compact disc has, however, a drawback that the service life thereof is relatively short because the cyanine dye is susceptible to a chemical change by sunlight.

There is also a known WORM-type compact disc using a phthalocyanine compound as an organic dye for the light absorption layer (Japanese Published Unexamined Patent Applications Nos. 58-183296 and 58-37851). The phthalocyanine dye-containing compact disc shows better light resistance in comparison with the cyanine dye-type compact disc. However, the phthalocyanine dye-type compact disc fails to simultaneously satisfy both optical characteristics required for writing optical information and a high index of reflectance required for reading the written information. In particular, the known phthalocyanine-type compact disc has a low absorbancy index (absorbancy per unit thickness of the light absorption layer) at a wave length near that of the laser beam used for the writing and reading, so that optical information cannot be satisfactorily written or recorded on the disc.

SUMMARY OF THE INVENTION

It is, therefore, the prime object of the present invention to provide an optical information recording medium which has improved light-resistance and which exhibits satisfactory light absorption characteristics.

There is provided in accordance with the present invention an optical information recording medium, which includes a substrate, and an information recording layer provided on the substrate and containing a metallophthalocyanine compound having the following general formula (I):

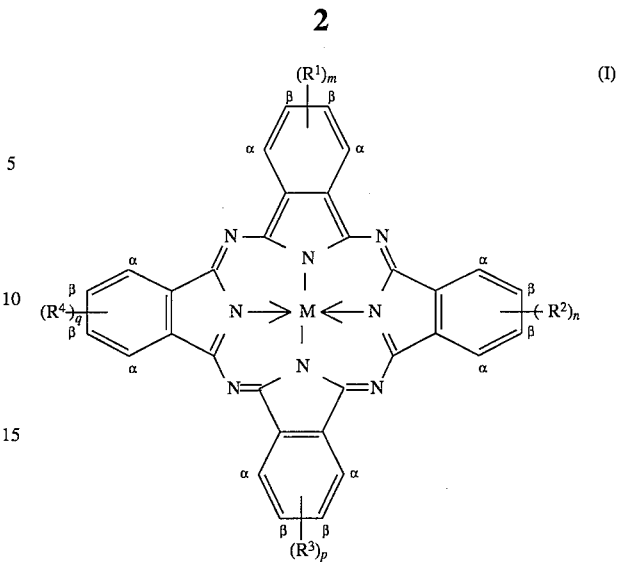

wherein M stands for (a) $M^1Y^1_{w-2}$ where $M^1$ represents a metal having a valence of 2–4, $Y^1$ represents a group selected from the group consisting of H, a halogen atom, —OH, —Z where Z represents an alkyl group, a phenyl group or a naphthyl group and —OZ where Z is as defined above and w is the valence of said metal or (b) $M^2=Y^2$ where $M^2$ represents a metal having a valence of 4 and $Y^2$ represents an atom selected from the group consisting of O and S, $R^1$ through $R^4$ stand, independently from each other, for (a) a halogen atom, (b) an alkyl group or (c) a group containing at least one atom selected from the group consisting of N, O and S with the proviso that at least one of the groups $R^1$ through $R^4$ stands for the group (c), and m, n, p and q stand, independently from each other, for an integer of 0–4 provided that m+n+p+q is 1 or more.

It has now been found that the low absorbancy index of the phthlocyanine compound used in the conventional compact disc is attributed to the association of the phthalocyanine molecules. It has also be found that the presence of one or more groups $R^1$ through $R^4$ each containing at least one of N, O and S atoms in the phthalocyanine ring of the metallophthalocyanine of the formula (I) can prevent or minimize the molecular association of the metallophthalocyanine molecules, so that the absorbancy index of an information recording layer containing the metallophthalocyanine is significantly large.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
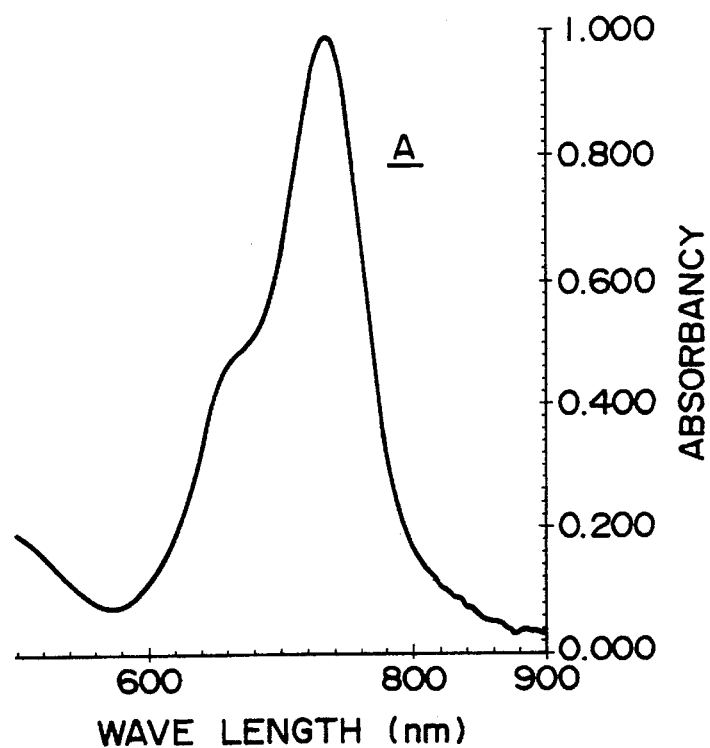
FIG. 1 is an absorption spectrum of the light absorption layer (information recording layer) of an optical information recording medium according to one embodiment of the present invention.

The optical information recording medium according to the present invention includes a substrate having a recording layer thereon.

Any conventionally employed substrate may be used for the purpose of the present invention. The material of which the substrate is formed may be, for example, a plastic material such as a polyester, an acrylic resin, a polyamide, a polycarbonate resin, a vinyl chloride resin, a polyolefin resin, a phenol resin, an epoxy resin or a polyimide, a glass or a ceramic. For reasons of dimensional stability, transparency and flatness, the use of a poly(methyl methacrylate) resin, a polycarbonate resin, an epoxy resin, an amorphous polyolefin resin, a polyester resin or glass is particularly preferred.

That surface of the substrate on which the recording layer is provided may be coated with a primer layer for the purpose of improving adhesion, improving flatness and preventing deterioration of the recording layer. The primer layer may be formed of a high molecular weight substance, such as a poly(methyl methacrylate), an acrylic acid/methacrylic acid copolymer, a styrene/maleic anhydride copolymer, a polyvinylalcohol, N-methylolacrylamide, a styrene/sulfonic acid copolymer, a styrene/vinyltoluene copolymer, a chlorosulfonated polyethylene, nitrocellulose, a poly(vinyl chloride), a chlorinated polyolefin, a polyester, a polyimide, a vinyl acetate/vinyl chloride copolymer, an ethylene/vinyl acetate copolymer, a polyethylene, a polypropylene or a polycarbonate; a silane coupling agent; or an inorganic substance such as $SiO_2$, $MgF_2$, SiO, $Al_2O_3$, ZnO, TiN or SiN. The primer layer has a thickness of 0.005–20 μm, preferably 0.01–10 μm.

The surface of the substrate or primer layer may be provided with a pregroup layer for the formation of tracking grooves and protrusions and depressions indicative of address signals. The pregroup layer may be formed of a mixture of at least one monomer selected from mono, di, tri and tetraesters of acrylic acid or a copolymer thereof with a photopolymerization initiator.

The recording layer provided on the substrate contains the specific metallophthalocyanine of the above formula (I). In the formula (I), the groups $R^1$ through $R^4$ are electron-donative groups containing at least one of S, O and N atoms having a lone electron-pair and preferably selected from those having one or more of the following linkages: $-NH_2$, $-NH-$, $-N-$, $-C=NH$, $-C=NOH$, $-N=C$, $-CO-$, $-O-$, $-COO-$,

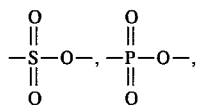

$-CS-$ and $-S-$.

In the formula (I), M represents $M^1Y^1_{w-2}$ or $M^2=Y^2$ where $M^1$ is a metal having a valence of 2–4 and $M^2$ is a metal having a valence of 4. Illustrative of metals having a valence of 2 are Cu, Zn, Fe, Co, Ni, Ru, Rh, Pd, Pt, Mn, Mg, Tl, Be, Ca, Ba, Cd, Hg, Pb and Sn. Illustrative of trivalent metals having one substituent ($M^1Y^1$) are Al-Cl, Al-Br, Al-F, Al-I, Ga-Cl, Ga-F, Ga-I, Ga-Br, In-Cl, In-Br, In-I, In-F, Tl-Cl, Tl-Br, Tl-I, Tl-F, Al-$C_6H_5$, Al-$C_6H_4CH_3$, In-$C_6H_5$, In-$C_6H_4CH_3$, In-$C_{10}H_7$, Mn-OH, Mn-O$C_6H_5$, M-n-OSi$(CH_3)_3$, Fe-Cl and Ru-Cl. Illustrative of tetravalent metals having two substitutents ($M^1Y^1_2$) are $CrCl_2$, $SiCl_2$, $SiBr_2$, $SiF_2$, $SiI_2$, $ZrCl_2$, $GeCl_2$, $GeBr_2$, $GeI_2$, $GeF_2$, $SnCl_2$, $SnBr_2$, $SnI_2$, $SnF_2$, $TlCl_2$, $TlBr_2$, $TlF_2$, $Si(OH)_2$, $Ge(OH)_2$, $Zr(OH)_2$, $Mn(OH)_2$, $Sn(OH)_2$, $TlR_2$, $CrR_2$, $SiR_2$, $SnR_2$, $GeR_2$, $Sn(SR)_2$, $Ge(SR)_2$, $Sn(OR)_2$, $Si(OR)_2$, $Ge(OR)_2$, $Tl(OR)_2$ or $Cr(OR)_2$ (R represents an alkyl group, a phenyl group, a naphthyl group, a trialkylsilyl group or a dialkylalkoxysilyl group each of which has one or more substituent). Illustrative of $M^2=Y^2$ are VO, MnO and TlO.

It is preferred that the metals $M^1$ and $M^2$ have 0–7 or 10 d-electrons, more preferably 5, 6, 7 or 10 d-electrons in the outermost shell thereof. Such metals include those belonging to VIIa, VIII, Ib and IIb of the Periodic Table. M is preferably $Mn^{2+}$, $Fe^{2+}$, $Co^{2+}$, $Zn^{2+}$ or $Cd^{2+}$.

The metallophthalocyanine of the formula (I) may be used in conjunction with another dye such as a cyanine dye, a pyrylium or thiopyrylium dye, an azulene dye, a squalilium dye, a naphthoquinone dye, an anthraquinone dye, an indaniline dye, a triphenylmethane dye, a triarylmethane dye, an aminium dye, a nitroso compound or a metal complex compound. These dyes may be used singly or in combination of two or more. If desired, the recording layer may further contain a binder, a stabilizer or like additive. The recording layer generally has a thickness of 100–5,000 Å, preferably 500–3,000 Å.

A reflective layer is preferably formed on the recording layer for the purpose of improving an S/N ratio, a reflecatance and sensitivity of recording. The reflective layer may be formed of an elemental metal or semimetal which shows a high reflectance and which is hard to be corroded. Examples of the material include Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ca, In, Si, Ge, Te, Pb, Po and Sn. Above all, Au, Ag and Al are preferred. These metals or semimetals may be used singly or as an alloy of two or more. The layer may be formed by vacuum deposition, sputtering, etc. The thickness of the layer is generally 100–3,000 Å. Alternatively, the reflective layer may be formed between the substrate and the recording layer. In this case, the recording and the reproduction of the information are performed on the recording layer side rather than on the substrate side.

A protecting layer may be provided on the top of the recording medium to protect the recording layer or the reflective layer from physical and chemical attack. An inorganic material such as SiO, $SiO_2$, $MgF_2$, $SnO_2$ or an organic material such as a thermoplastic resin, a thermosetting resin or a UV-hardenable resin may be used for the formation of the protecting layer. If desired, a protecting layer may be formed on each of the opposite surfaces of the recording medium. The thickness of the protecting layer is generally in the range of 500 Å to 50 μm.

The optical information recording medium of the preent invention may be prepared by a process including (a) a recording layer preparation step in which a coating liquid containing the metallophthalocyanine compound of the formula (I) is applied, directly or through a primer layer, to a surface of a substrate on which information pits and/or tracking grooves have been formed, (b) a reflective layer preparation step in which a reflective layer is formed under vacuum, and (c) a protecting layer preparation step.

The coating liquid is prepared by dissolving the phthalocyanine compound of the formula (I) and other optional ingredients in an organic solvent and the solution is applied by a conventional coating method such as spraying, roller coating, dipping or spinner coating. As the organic solvent, there may be used an alcohol such as methanol, ethanol or isopropanol; a ketone such as acetone, methyl ethyl ketone or cyclohexanone; an amide such as N,N-dimethylacetamide or N,N-dimethylformamide; a sulfoxide such as dimethylsulfoxide; an ether such as tetrahydrofuran, dioxane, diethyl ether or ethyleneglycol monomethyl ether; an ester such as methyl acetate or ethyl acetate; an aliphatic halogenated hydrocarbon such as chloroform, methylene chloride, dichloroethane, carbon tetrachloride or trichloroethane; an aromatic such as benzene, xylene, monochlorobenzene or dichlorobenzene; or a cellosolve such as methylcellosolve or ethylcellosolve. For reasons of an increased layer thickness, the spin coating method is preferably used. In formation of a primer layer, a coating liquid containing the above-described primer material is applied to the substrate, before the formation of the recording layer, by any known suitable method such as spin coating, dip coating or extrusion coating.

The reflective layer may be formed by any suitable known method such as vacuum deposition, sputtering or ion plating.

The protecting layer may be formed by any suitable known method. When a UV-hardenable resin is used, a coating liquid containing the resin is applied by, for example, spin coating and the resin is irradiated with UV ray for curing.

The following examples will further illustrate the present invention.

EXAMPLE 1

A metallophthalocyanine having the formula (A) below was dissolved in chloroform to obtain a coating liquid. The coating liquid was applied by spin coating to a glass substrate having a diameter of 120 mm and a thickness of 1.2 mm to form a recording layer which showed an absorption spectrum as schematically shown in FIG. 1.

Figure 2:
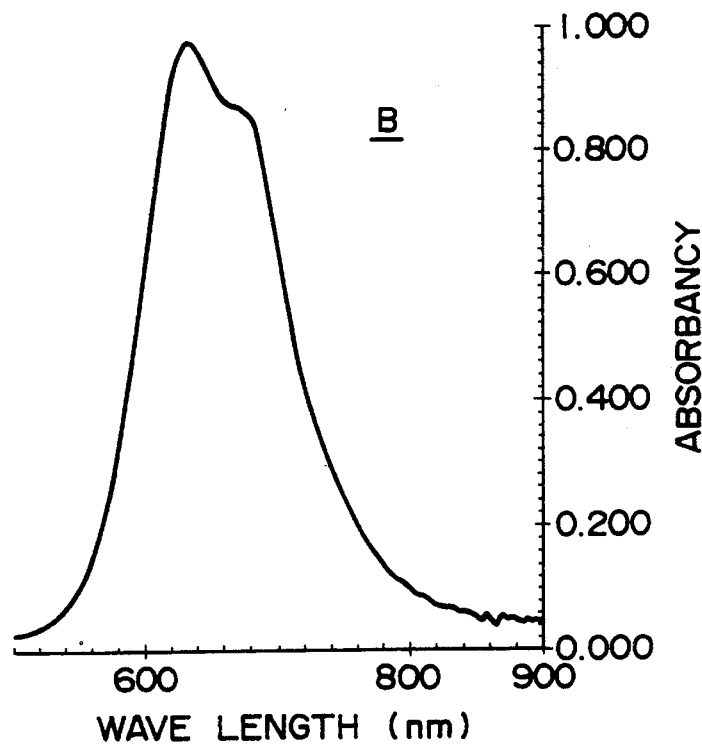
FIG. 2 is an absorption spectrum of the light absorption layer of the conventional optical information recording medium.

The recording layer showed an absorption spectrum as schematically shown in FIG. 2.

As seen in FIG. 1, the longer wave length peak is very strong and the short wave length peak is weak in the recording layer of the present invention. In contrast, as shown in FIG. 2, the shorter wave length peak is very strong and the longer wave length peak is weak in the conventional recording layer, because of association of the phthalocyanine molecules (B). Presumably, in the recording medium of the present invention, the electron-donative groups ($R^1$–$R^4$) can interact by intermolecular coordination with the center metal (M) of the phthalocyanine (A), so that molecular association is remarkably reduced.

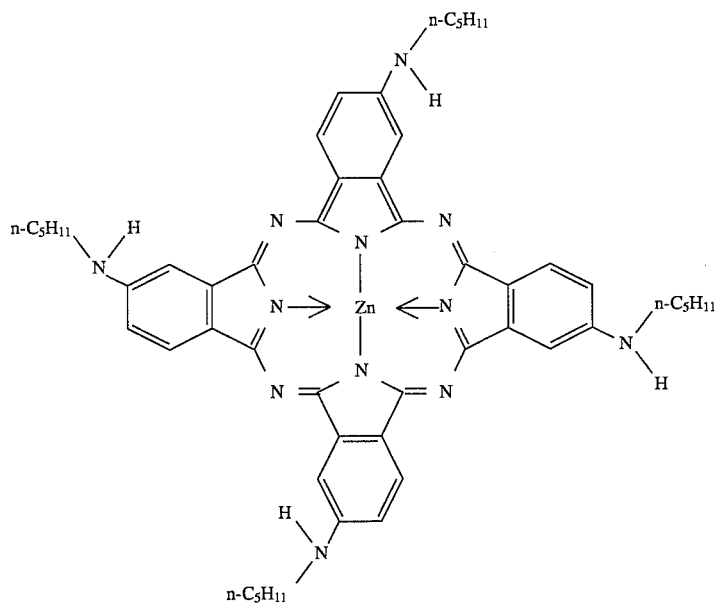

(A)

COMPARATIVE EXAMPLE 1

Example 1 was repeated in the same manner as described except that a metallophthalocyanine having the formula (B) was substituted for the phthalocyanine of the formula (A).

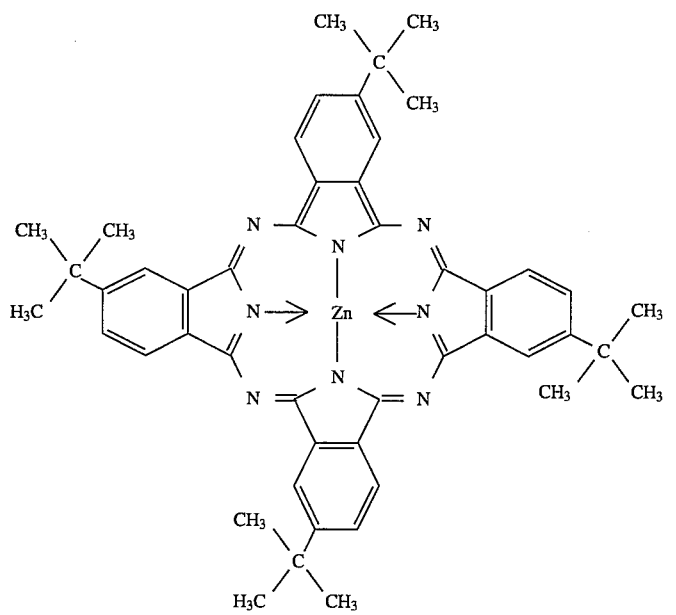

(B)

EXAMPLES 2-6

Figure 3:
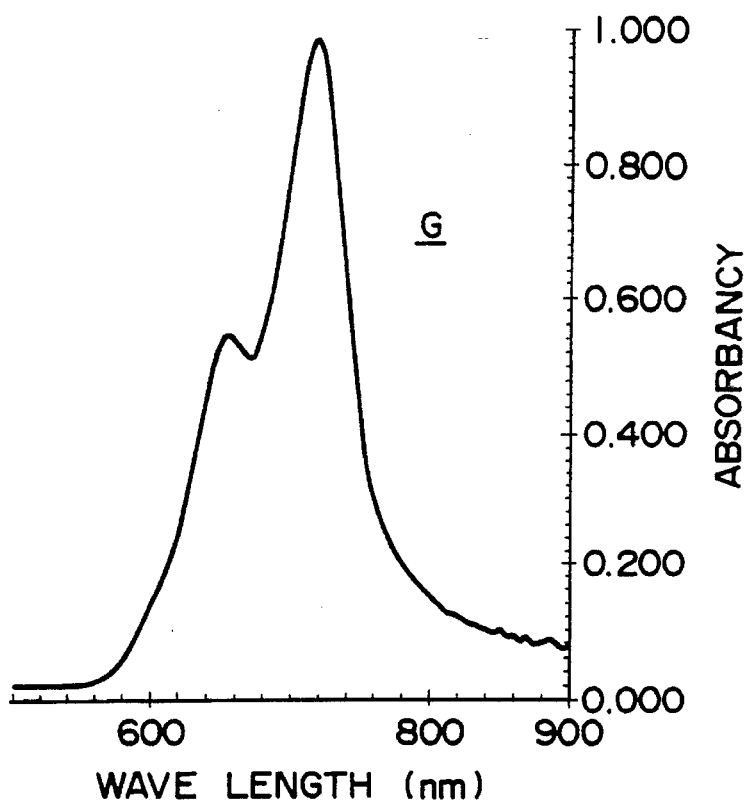
FIG. 3 is an absorption spectrum of the light absorption layer of an optical information recording medium according to another embodiment.

Example 1 was repeated in the same manner as described except that each of the metallophthalocyanine compounds C–G having the structure shown in Table 1 was substituted for the compound A. The $\lambda_{max}$ and the absorbancy index of the recording layer of the thus obtained recording media are shown in Table 1. An absorption spectrum of the recording layer containing the compound G is shown in FIG. 3. The groups $R^1$–$R^4$ of each of the compounds C–G are as follows:

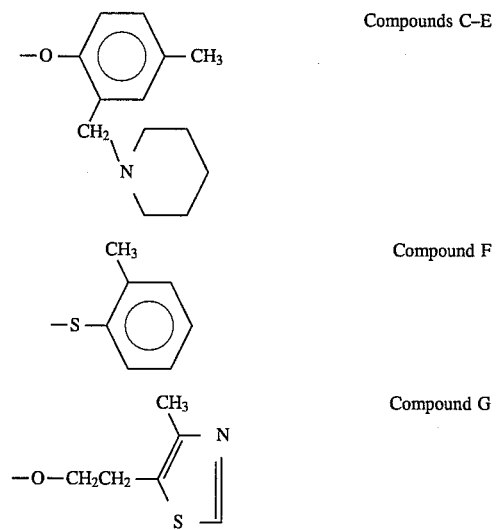

TABLE 1

| Phthalo-cyanime | Center Metal | Number of d-electrons | Position of $R^1$–$R^4$ | $\lambda_{max}$ (nm) | Absorbancy Index (×10⁴/cm) |
|---|---|---|---|---|---|
| C | $Zn^{2+}$ | 10 | α | 710 | 28–35 |
| D | $Cd^{2+}$ | 10 | α | 715 | 25 |
| E | $Cu^{2+}$ | 9 | α | 715 | 16–18 |
| F | $Zn^{2+}$ | 10 | α | 730 | 18–21 |
| G | $Zn^{2+}$ | 10 | α | 719 | 28 |

Figure 4:
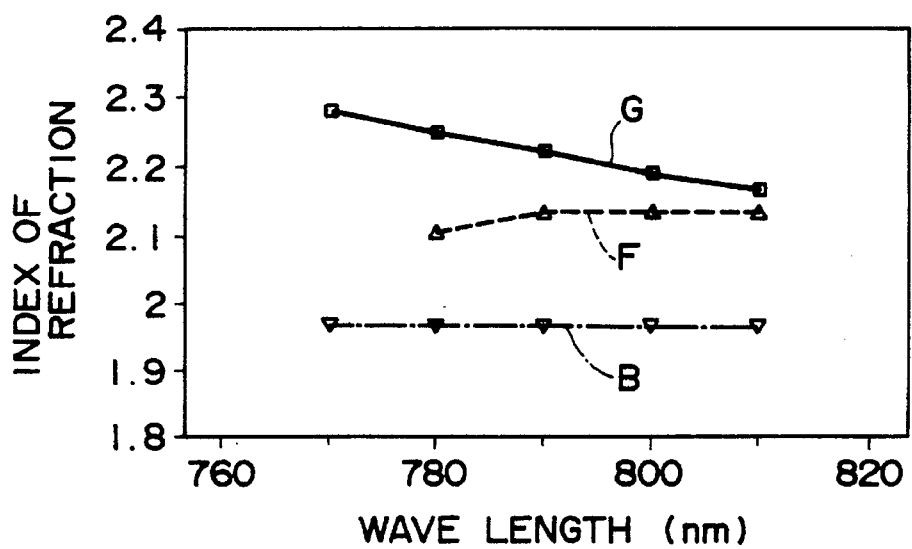
FIG. 4 is a graph showing a relationship between the wave length and the index of refraction of the phthalocyanine compounds used in the present invention.

Further, refraction indeces of the recording layers containing the metallophthalocyanine compounds B, F and G at a wave length region near the semiconductor laser beam were determined from the results of the reflectance. The results are shown in FIG. 4, in which the plots designated as F, G and B are those of the recording layers containing the compounds F, G and B, respectively.

EXAMPLE 7

The metallophthalocyanine compound of the formula (G) was dissolved in 1,2-dichloroethane and the solution was applied by spin coating to a surface of a substrate formed of an amorphous polyolefin and having a diameter of 120 mm and a thickness of 1.2 mm, thereby obtaining a recording layer having a thickness of about 1,500 Å. The substrate had been provided with a pattern of guide groove protrusions and depressions having a depth of abour 1,200 Å. A reflective layer formed of Au and having a thickness of about 800 Å was then formed on the recording layer by sputtering. Finally, a coating solution containing a UV-hardenable resin was applied on the reflective layer and the coating was irradiated with a UV ray to form a protecting layer having a thickness of about 5 μm. EFM signals were then recorded on the thus obtained recording medium under the conditions involving a laser beam wave length of 785 nm, a numerical aperture (N. A.) of 0.5 and a linear speed of 1.4 m/s. The recorded information was then reproduced to reveal that the $I_{top}$ was 66% and C1 error was 220. Thus, the recording medium was found to meet with the standards required for CD.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. An optical information recording medium, comprising a substrate, and an information recording layer provided on said substrate and containing a phthalocyanine compound having the following formula (I):

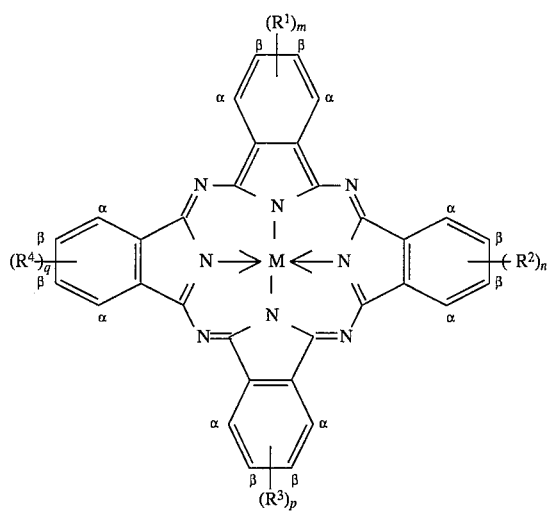

wherein M stands for $M^1Y^1{}_{w-2}$ where $M^1$ represents a metal having a valence of 2–4, $Y^1$ represents a group selected from the group consisting of H, a halogen atom, —OH, —Z where Z represents an alkyl group, a phenyl group or a naphthyl group and —OZ where Z is as defined above and w is the valence of said metal or $M^2=Y^2$ where $M^2$ represents a metal having a valence of 4 and $Y^2$ represents an atom selected from the group consisting of O and S, $R^1$ through $R^4$ stand, independently from each other, for (a) a halogen atom, (b) an alkyl group or (c) a group selected from —NH—R where R represents a lower alkyl group,

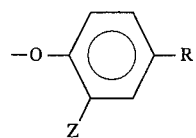

where R represents a lower alkyl group and Z represents a piperidinomethyl group, or

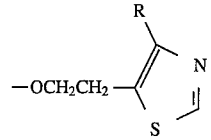

where R represents a lower alkyl group, with the proviso that at least one of the groups $R^1$ through $R^4$ stands for the group (c), and m, n, p and q stand, independently from each other, for an integer of 0–4 provided that m+n+p+q is 1 or more.

2. A recording medium as claimed in claim 1, wherein said metals $M^1$ and $M^2$ have d-electrons in the outermost electron shell thereof.

3. A recording medium as claimed in claim 2, wherein the number of said d-electrons is 5, 6, 7 or 10.

4. A recording medium as claimed in claim 1, wherein M is $Mn^{2+}$, $Fe^{2+}$, $Co^{2+}$, $Zn^{2+}$, $Cd^{2+}$ or $Cu^{2+}$.

* * * * *

UNITED STATES PATENT AND TRADEMARK OFFICE
CERTIFICATE OF CORRECTION

PATENT NO. : 5,532,033
DATED : July 2, 1996
INVENTOR(S) : Toru YASHIRO It is certified that error appears in the above-identified patent and that said Letters Patent is hereby corrected as shown below:

Column 2, line 39, "also be found" should read --also been found--.

Column 3, line 66, "M-n-OSi(CH$_3$)$_3$," should read --Mn-OSi(CH$_3$)$_3$,--.

Column 4, line 53, "the preent invention" should read --the present invention--.

Column 8, line 42, "of abour 1,200Å" should read --of about 1,200Å--.

Signed and Sealed this

Twenty-ninth Day of April, 1997

Attest:

BRUCE LEHMAN

*Attesting Officer*    *Commissioner of Patents and Trademarks*